July 18, 1950   H. H. CURRY   2,515,496
ELECTRICAL MACHINE FOR SELF-SYNCHRONOUS SYSTEMS
Original Filed Jan. 13, 1949   3 Sheets-Sheet 1

INVENTOR.
HERMAN H. CURRY
BY
*M. A. Hayes*
ATTORNEY

July 18, 1950  H. H. CURRY  2,515,496
ELECTRICAL MACHINE FOR SELF-SYNCHRONOUS SYSTEMS
Original Filed Jan. 13, 1949  3 Sheets-Sheet 2

INVENTOR.
HERMAN H. CURRY
BY
ATTORNEY

July 18, 1950          H. H. CURRY          2,515,496
ELECTRICAL MACHINE FOR SELF-SYNCHRONOUS SYSTEMS Original Filed Jan. 13, 1949          3 Sheets-Sheet 3

INVENTOR.
HERMAN H. CURRY
BY *M. A. Hayes*
ATTORNEY

Patented July 18, 1950

2,515,496

UNITED STATES PATENT OFFICE 2,515,496

ELECTRICAL MACHINE FOR SELF-SYNCHRONOUS SYSTEMS

Herman H. Curry, Inverness, Fla.

Continuation of application Serial No. 70,781, January 13, 1949. This application November 17, 1949, Serial No. 127,904

33 Claims. (Cl. 318—24)

(Granted under the act of March 3, 1883, as amended April 30, 1928; 370 O. G. 757)

This invention relates to improvements in electrical machines, particularly to those used in self-synchronous systems designed to reproduce angular motion at a distance.

This application is a continuation of my copending application entitled "Electrical Machines for Self-Synchronous Systems," Serial Number 70,781, filed January 13, 1949, now abandoned.

More specifically, the invention contemplates improving the torque characteristics of self-synchronous machines to increase the sensitivity thereof, particularly when the displacement, as expressed in electrical degrees, between the primary and secondary windings is relatively small.

Self-synchronous systems, used in fire-control equipment, gyroscopic compass repeaters and similar applications, are sometimes referred to as synchro-tie or Selsyn apparatus and, as indicated, are for transmitting angles. Where the equipment is required to be self-synchronizing after power failure, single-speed units are required. Greater accuracy can be obtained by using multiple-speed units, but only at the loss of the self-synchronous feature. In the usual application, great accuracy is desirable and as the error is a function of the air-gap torque required of the apparatus, which in most cases is only friction, a rapid increase of torque with the angle of deflection is more desirable than a high maximum torque at large angles of deflection.

It is the object of this invention to improve the operating characteristics of self-synchronous electrical machines.

Another object is to increase the torque of self-synchronous electrical machines at small angular displacement.

Another object is to combine the operating characteristics of several electrical machines to produce a desired resultant operating characteristic.

Another object is to combine torques of self-synchronous machines of different characteristics to produce a desired resultant torque.

Another object is to increase the sensitivity of self-synchronous systems.

Another object is to increase the torque of the receiver in a self-synchronous system for small angular displacement of the generator.

Another object is to apply torques of machines of different numbers of poles to a common shaft to obtain a desired resultant torque.

Another object is to provide a self-synchronous machine of high torque close to the point where the generator and receiver are in phase thereby increasing the sensitivity of the system using such machines.

Figure 1:
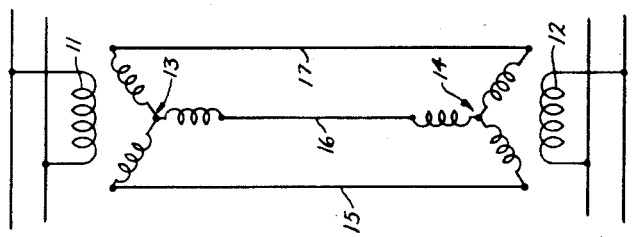
Fig. 1 is a diagrammatical illustration of a conventional self-synchronous system.

Self-synchronous systems usually comprise two machines, one designated as a generator and the other, which repeats any movement thereof, as a receiver. As shown in Fig. 1 the machines can have single-phase stator or primary windings 11, 12 connected to a common single-phase source of electric power with the rotors 13, 14 carrying three-phase rotor or secondary windings which are electrically connected by suitable conductors 15, 16, 17. Or the stators can have three-phase secondary windings that are electrically connected, while single-phase primary windings on the rotors are connected to a source of single-phase electric power. When, in either case, the windings are properly phased out the rotors remain stationary in the same angular relation to their respective stators. The voltages in the connected windings are then equal and opposite and no current flows therebetween. However, if one rotor is displaced in space phase, a resultant voltage becomes available for circulating a current through the connected windings which will produce a torque in the receiver tending to turn the rotor thereof to a position corresponding to the new position of the generator rotor, the two rotors thus tending to move in synchronism. The torque developed in the receiver tending to turn the rotor to the angular position assumed by the generator rotor varies in magnitude with the angle of displacement between said rotors. When the displacement between the rotors is small, the restoring torque developed in the receiver is small and when the displacement is large, the torque is large. If multipole machines are used, the system is no longer self-synchronous as the space degrees and electrical degrees per pair of poles will not necessarily coincide. For example, a four-pole machine will have 360 electrical degrees per pair of poles for an equivalent 180 space degrees. Accordingly, the receiver rotor may assume either of two space positions.

Figure 2:
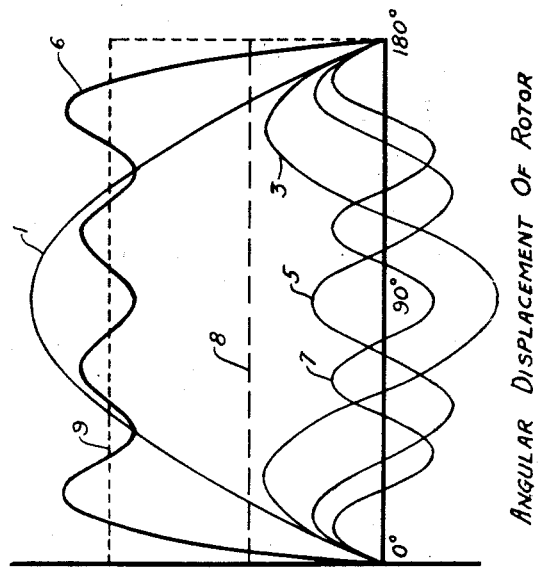
Fig. 2 is a chart of several torque curves illustrative of the operation of the invention.

Fig. 2 shows the nature of the torque curves of machines having different numbers of poles and can represent either the torque required to turn the generator or the torque developed in the receiver from power transmitted thereto by the generator. In the interest of simplification, the following discussion makes reference only to the torque developed in the receiver though the construction of the generator and receiver are identical. Curve 1 represents the torque developed in the customary two-pole self-synchronous machine over 180° of space displacement which, in this instance, coincides with the electrical displacement. The torque developed at displacements approaching zero and 180° is relatively low. If the frictional torque of the machine is of a value represented by the broken line 8, the rotor will not turn until the displacement between the generator and receiver rotors is about 20° at which point the torque developed in the receiver rotor equals the frictional torque. The optimum curve would be one that has high torque at low values of displacement such as the rectangular curve 9 which would cause the rotor to turn with the slightest rotor displacement.

For a six-pole machine, 360 electrical degrees corresponds to 120 space degrees and the torque curve 3 therefor discloses its relation to the torque curve 1 of the two-pole machine. For the same angular displacement, the torque developed in the six-pole machine passes through one and one-half cycles while that developed in the two-pole machine passes through one-half cycle.

Similarly, ten- and fourteen-pole machines have space displacements of 70° and 50°, respectively, for a corresponding electrical displacement of 360 degrees. Torque curves 5 and 7 are for ten- and fourteen-pole machines and graphically show that the torque developed therein passes through two and one-half and three and one-half cycles, respectively, for the equivalent one-half cycle change in the torque fluctuation of the two-pole machine. Therefore, if these machines operate on one shaft, the resultant torque will be the sum of the separate torques at any particular angle of displacement and, if the torque of the multiple machines is of a value appreciably less than that of the two-pole machine, the self-synchronous feature is retained. The combining of these several torques is best shown graphically as in Fig. 2 wherein the curves 1, 3, 5 and 7 represent the torque developed by two-, six-, ten- and fourteen-pole machines, respectively. The sum of these curves is the resultant curve 6 and represents the net effective or resultant torque of the several machines. As the torque developed by the two-pole machine dominates that developed by the multipole machines, the cycle of the resultant torque, represented by curve 6, coincides with that of the two-pole machine. That is to say, the space displacement of the resultant torque coincides with an electrical displacement of 180°, making the machine developing such resultant torque self-synchronous.

In order that the device function properly, the resultant torque curve 6 must be symmetrical about its 180° axis. That is to say, the torque curve for 180° to 360° must be similar to that shown for 0° to 180°, but inverted. The shape of the torque curves developed in the individual machine of the kind here considered are approximately sinusoidal. That is to say, the torque tending to synchronize the rotors of the two machines varies approximately sinusoidally with the angular displacement of the rotors. While sinusoidal torque characteristics have been shown in the drawings and described in the specification in the interest of simplicity, it is to be understood that machines in which the torque varies non-sinusoidally with rotor displacement may be used and it is not intended that the invention be restricted to a particular torque characteristic except as set forth in the claims. Sine waves comprising a fundamental and odd harmonics can be combined to produce a resultant wave or curve which is symmetrical about its 180° axis, providing the phase angles of all harmonics are zero or 180° when the phase angle for the fundamental is zero. Accordingly, the number of poles in the multipole machines are determined by their ability to produce torques that will combine with that of the two-pole machine to produce a resultant torque symmetrical about its 180° axis. The number of poles will therefore be two, the number of poles on the two-pole machine, plus some multiple of four. Such multiple machines have been stated above to have six, ten and fourteen poles whose torque curves are similar to those shown in Fig. 2. Additional multipole machines can be used though the approximation to a rectangular torque curve effected by those mentioned above are sufficient for all practical purposes.

The magnitude of the torque developed by the individual machines must also be such as to produce the proper resultant torque. As only the two-pole machine is self-synchronous, the torque thereof must predominate and the torques produced by the multipole machines are superimposed thereon merely to alter the characteristics thereof. Therefore, by combining torques of proper magnitudes and frequencies, any desired resultant torque can be obtained. For example, in Fig. 2, the maximum torque of a six-pole machine is shown as one-third that of the two-pole machine, and the ten- and fourteen-pole machines as one-fifth and one-seventh thereof, respectively, and the rotors of the machines are so mounted that when the torque of the two-pole machine is zero, that developed by the multipole machine is zero. The characteristics of the resultant torque produced by the several machines, if applied to one shaft, is shown as torque curve 6, which approximate the optimum torque curve 9, producing a relatively large torque for low angles of displacement.

Additional multipole machines can be used further to alter the resultant torque, and the maximum value of the torques developed by the several machines can be other than that set forth in the preceding paragraph, as many combinations can be found to improve the torque characteristic of the composite device.

Figure 3:
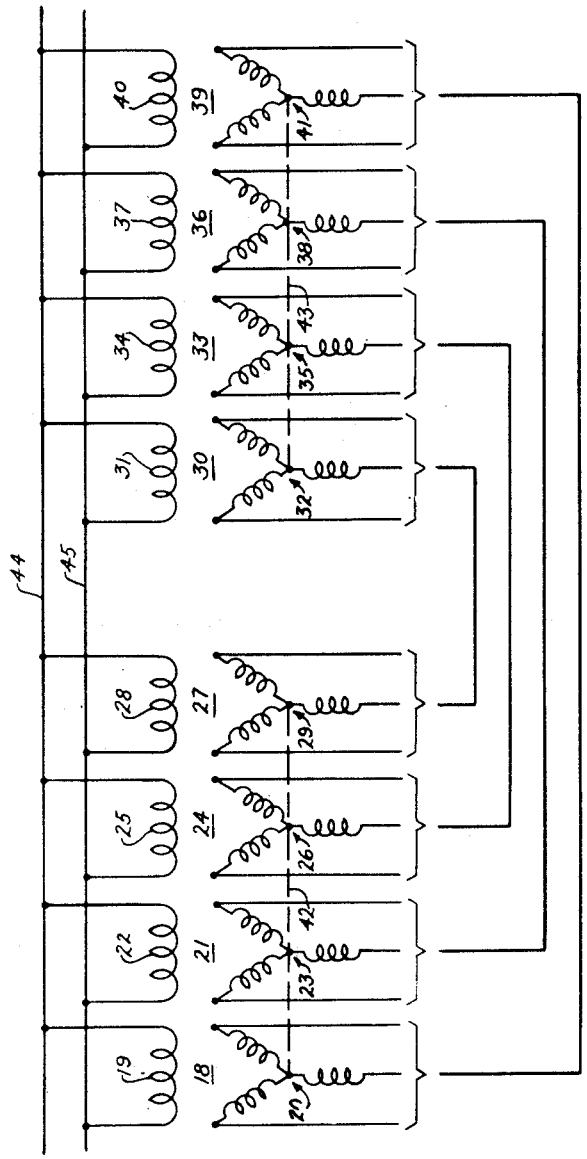
Fig. 3 is a diagrammatical illustration of an embodiment of the invention wherein several motors of different torque characteristics are mounted on one shaft.

In carrying out the invention there can be separately wound generators and receivers of the requisite number of poles mounted on common shafts for producing the several torques as shown in Fig. 3. The two-pole generator 18 has a single-phase stator winding 19 coupled to the alternating-current power lines 44, 45 and a three-phase rotor winding 20. The six-, ten- and fourteen-pole generators 21, 24, and 27 likewise have stator windings 22, 25 and 28 respectively, also coupled to the power lines, and three-phase rotor windings 23, 26 and 29. These rotors are all fixedly mounted on the shaft 42 and turn as a unit. The receiver 39 has a two-pole stator 40 connected to the power lines 44, 45 and a three-phase rotor winding 41. The six-, ten- and fourteen-pole receivers 36, 33 and 30 likewise have stator windings 37, 34 and 31 coupled to the power lines and three-phase rotor windings 38, 35 and 32 fixedly mounted on the shaft 43 along with rotor winding 41 of the two-pole receiver 39 for rotation as a unit. The rotor winding 20 of the two-pole generator 18 has each phase thereof electrically connected by suitable conductors (not shown) to the corresponding phase of the rotor winding 41 of the receiver 39. Similarly, the six-, ten- and fourteen-pole generators 21, 24 and 27 have their rotor windings electrically connected to the corresponding rotor windings 38, 35 and 32 of the receivers 36, 33 and 30.

Any movement of the generator rotor unbalances the electrical system causing a current to flow from the several generator rotor windings to the receiver rotor windings, developing a torque therein tending to cause the receiver rotors to assume the same angular position taken by the generator rotors. As the rotors are fixed to the shafts 42 and 43, the torque required to turn, or that developed, is the sum of the torques developed in the several machines as discussed above.

To produce a torque characteristic that is symmetrical about its 180° axis, the rotors and stators of the several machines, comprising either the generator or receiver as a self-synchronous unit, must be arranged in selected phase relation. That is to say, the rotors 23, 26 and 29 of the generator, and the rotors 32, 35 and 38 of the receiver must be fastened to the shafts 42 and 43, respectively, in a space phase position with respect to the two-pole machines 18 and 39, so that the torque produced by the multipole machines is zero when the torque of the two-pole machines is zero.

If the magnitude of the torques developed by the several machines comprising the receiver, Fig. 3, are of the value assumed in Fig. 2, then the resultant torque curve will be similar to curve 5, resulting in an increase in rotor torque for low values of angular displacement of the generator rotor.

Figure 4:
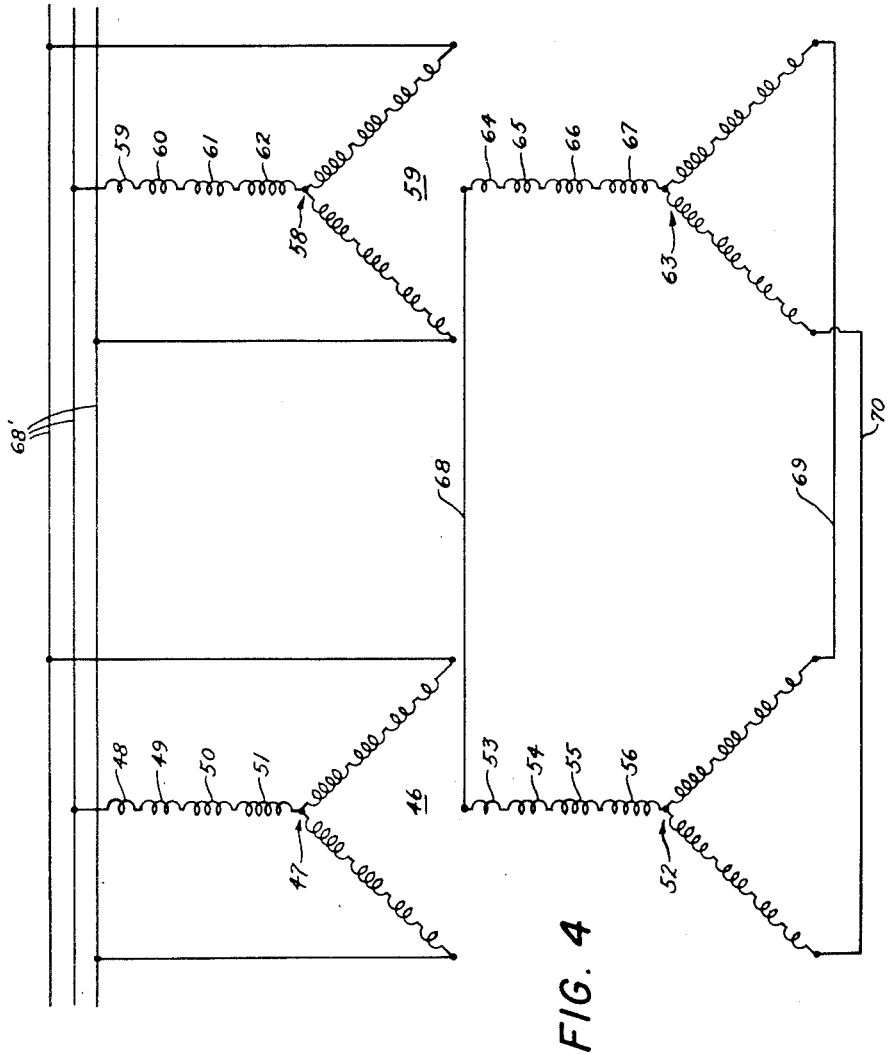
Fig. 4 is a diagrammatical illustration of an embodiment of the invention wherein the windings corresponding to different machines are wound on one machine.

A modification of the embodiment of the invention previously described comprises the use of one stator and one rotor, for either the generator or the receiver, carrying the equivalent windings of the two-, six-, ten- and fourteen-pole machines. A diagram of such a device is shown in Fig. 4. The generator 46 has a three-phase stator winding 47 connected to the three-phase power line 68'. Each phase of the stator winding is composed of the winding 48 of a fourteen-pole machine, the winding 49 of a ten-pole machine, the winding 50 of a six-pole machine and the winding 51 of a two-pole machine. These windings are connected in series and are merely superimposed when wound upon the stator. Similarly, the three-phase rotor winding 52 has, in each phase, a fourteen-, ten-, six- and two-pole winding, 53, 54, 55 and 56, respectively. The receiver 57 has a stator winding 58 connected to the line 68' with each phase thereof wound similarly to that of the generator, that is with fourteen-, ten-, six- and two-pole windings 59, 60, 61 and 62 in series in each phase. The receiver rotor winding 63 likewise has fourteen-, ten-, six- and two-pole windings 64, 65, 66 and 67 in each phase. Each phase winding of the generator rotor winding 52 is electrically connected by means of conductors 68, 69 and 70 to the corresponding phase winding of the receiver rotor winding 63. In operation, the torque developed in the receiver 57 is the resultant torque produced by each of the several windings.

For best operation these windings must be so placed that when the torque produced by the two-pole winding is zero, that produced by the multipole windings is zero.

In case of the superimposed windings for the two-pole and multipole machines described in the preceding paragraph, many slots carry pairs of conductors in which the current flows in opposite directions. The effect of such pairs is canceled and the winding can, accordingly, be simplified by the omission of such pairs from the slots.

Primaries can of course be wound for 3 phase excitation if arranged to prevent motorizing as in present Selsyn practice.

Although I have described the preferred form of my invention, I wish not to limit myself to the precise details as shown but wish to avail myself of such variations and modifications as come within the scope of the appended claims.

The invention described herein may be manufactured and used by or for the Government of the United States of America for governmental purposes without the payment of any royalties thereon or therefor.

I claim:

1. A self-synchronous machine comprising a rotor and a stator and adapted for rotor synchronization with the rotor of a similar machine, windings on said rotor and stator for producing a synchronizing torque which has a one cycle sinusoidal variation in magnitude for 360° displacement of the said rotor with reference to the rotor of said similar machine, and additional windings on said rotor and stator producing an additional torque of smaller magnitude and having a sinusoidal variation in magnitude of an odd number of cycles for a 360° displacement of said rotor, whereby the magnitude of the synchronizing torque is increased at small angles of rotor displacement.

2. A self-synchronous machine comprising a rotor and a stator and adapted for rotor synchronization with the rotor of a similar machine, windings on said rotor and stator for producing a torque which has a one cycle sinusoidal variation in magnitude for a 360° displacement of said rotor with reference to the rotor of said similar machine, and additional windings on said rotor and stator for producing an additional torque of lesser magnitude which varies an odd number of cycles for 360° displacement of said rotor whereby the torque at small angles of rotor displacement is increased.

3. A self-synchronous machine comprising a rotor and a stator and adapted for rotor synchronization with the rotor of a similar machine, windings on said rotor and stator for producing a synchronizing torque having a one cycle sinusoidal variation in magnitude for 360° of rotor d'splacement with reference to the rotor of said similar machine, and additional windings for producing supplemental torques of an odd number of cycles for 360° of rotor displacement whereby the synchronizing torque is increased at small angles of rotor displacement.

4. A self-synchronous system comprising a generator and a receiver, said generator and receiver each comprising a rotor and a stator, windings on said rotor and stator for generating a synchronizing torque having a one cycle variation in magnitude for 360° of relative rotor displacement, and additional windings for producing supplemental torques of an odd number of cycles for 360° of relative rotor displacement, said rotor windings of said generator being connected to the respective rotor windings of said receiver, a source of alternating current and said stator windings connected to said source of alternating current whereby the synchronizing torque developed in said receiver is increased for small angles of displacement between said rotors of said generator and said receiver.

5. A self-synchronous system comprising a generator and a receiver, each thereof comprising a two pole self-synchronous machine having a rotor and a stator, windings carried by said rotor and stator, and six, ten and fourteen pole machines each having rotors and stators, windings carried by said rotors and stators, the said rotors of said machines mounted for rotation as a unit in said generator and receiver, conductors connecting each of said generator rotor windings with the respective rotor windings of said receiver, a source of alternating current and all of said stator windings connected to said source, whereby displacement of the said receiver rotors with respect to the said generator rotors develops a large torque in the said receiver for small angles of displacement.

6. The system claimed in claim 5 wherein the power of the two pole machines is greater than the power of the multipole machines.

7. An electrical machine for an alternating current self-synchronous system comprising a two pole machine, a six pole machine, a ten pole machine and a fourteen pole machine, stators and rotors for each machine, windings carried by said stators and rotors, a shaft, said rotors fixed to said shaft in selected phase relation, and said stator windings adapted to be supplied with alternating current.

8. In combination, a source of alternating current and an electrical machine for self-synchronous systems comprising a two pole machine having a wound stator and rotor, a six pole machine having a wound stator and rotor, a ten pole machine having a wound stator and rotor and a fourteen pole machine having a wound stator and rotor, a shaft, said rotors affixed to said shaft in selected phase relation whereby when the torque of the two pole machine is zero, the torques of the multipole machines are zero, said wound stators adapted to be connected to said source of alternating current.

9. An electrical machine for self-synchronous systems comprising a stator and a rotor and adapted for rotor synchronization with the rotor of a similar machine, two pole windings thereon for developing a dominant unidirectional torque through 180 space degrees of rotor displacement with reference to the rotor of said similar machine, multipole windings carried by said rotor and stator for producing fluctuating torques of relatively smaller magnitudes through the same angular displacement of the rotor whereby the two pole torque has superimposed thereon the multipole torques.

10. An electrical machine for self-synchronous systems comprising a stator and a rotor and adapted for rotor synchronization with the rotor of a similar machine, two pole windings carried by said stator and rotor for developing a torque varying sinusoidally through the space displacement of said rotor with reference to the rotor of said similar machine, multipole windings carried by said stator and rotor developing torques of relatively lesser magnitude and which vary sinusoidally in proportion to the number of poles in said windings, whereby the resultant torque is the sum of the torques produced by the said windings.

11. An electrical machine for self-synchronous systems comprising a rotor and stator combination adapted for synchronization with the rotor and stator combination of a similar machine, the stator of said machine including means for developing a first magnetic field for causing said rotor to develop a first torque varying sinusoidally from zero to maximum to zero through a 180-degree asynchronous displacement of the rotors from a synchronous position, and further means in said stator for developing a second magnetic field of magnitude less than said first magnetic field, thereby to produce a second torque of relatively smaller magnitude which varies sinusoidally at a frequency that is odd multiple of that of said first torque, whereby the torque developed by said machine is the resultant of said first and second torques.

12. An electrical machine for self-synchronous systems comprising, in combination, a two pole self-synchronous machine having a wound stator and rotor and a multipole machine having a wound stator and rotor, said multipole machine having a number of poles that is some multiple of four greater than the number in the two pole machine, said rotors being mounted to rotate as a unit.

13. A machine as claimed in claim 12 and said two pole machine being of larger rating than the rating of the said multipole machine whereby the torque at small angles of rotor displacement is increased.

14. A machine as claimed in claim 12 and said multipole rotor and said two pole rotor mounted in a position where the torque of the multipole rotor is zero when the torque of the two pole rotor is zero.

15. An electrical machine for self-synchronous systems comprising, in combination, a two pole self-synchronous machine having a wound stator and rotor and a series of multipole machines having wound stators and rotors, each of said multipole machines having a number of poles that is some multiple of four greater than the number of poles in the said two pole machine, said rotors being mounted in selected phase relation to rotate as a unit.

16. A machine as claimed in claim 15 the said two pole machine being capable of developing a torque greater than that produced by the said multipole machines.

17. A self-synchronous machine comprising a rotor and stator, windings on said rotor and stator and adapted for rotor-stator synchronization with the rotor of a similar machine for producing at least two synchronizing torques which have a different number of cycles of variation in magnitude throughout a given displacement between said rotor and stator with reference to the rotor and stator of said similar machine, the variations of said torques being individually of such magnitudes and so correlated as to provide a relatively high synchronizing torque for small angles of relative displacement between said rotors and stators.

18. A self-synchronous machine of the character recited in claim 17 in which the one of said torques having the greater number of cycles of variation is of lesser maximum magnitude than the other torque.

19. A self-synchronous machine comprising a rotor and stator and adapted for rotor synchronization with the rotor and stator of a similar machine, windings on said rotor and stator for producing a synchronizing torque which has a single cycle variation in magnitude throughout 360° of displacement between said rotor and stator with reference to the rotor and stator of said similar machine, and electrical means also causing said rotor to produce an additional torque and having a variation in magnitude of more than one cycle throughout said 360° of displacement, the variations in said torques being individually of such magnitudes and so correlated as to provide a relatively high synchronizing torque for small angles of relative displacement between said rotors and stators.

20. A self-synchronous machine comprising a rotor and stator and adapted for rotor-stator synchronization with the rotor and stator of a similar machine, windings on said rotor and stator for producing a torque which has a single cycle of variation in magnitude throughout 360° of displacement between said rotor and stator with reference to the rotor and stator of said similar machine, and additional windings for producing an additional torque of smaller maximum magnitude than said first-mentioned torque, and having a variation in magnitude of an odd number of cycles throughout said 360° of relative displacement, the variations in said torques being individually of such magnitudes and so correlated as to provide a relatively high synchronizing torque for small angles of relative displacement between said rotors and stators.

21. A machine of the character described, comprising a stator and rotor adapted for rotor synchronization with the rotor of a similar machine, two-pole windings thereon for developing a torque which has a single cycle of variation in magnitude throughout 360° of relative displacement between said stator and rotor with reference to the rotor of said similar machine, and multipole windings for producing an additional torque having a relatively smaller maximum magnitude than said first-mentioned torque and having variations in magnitude of more than one cycle throughout said 360° of displacement whereby to provide algebraically additive torques.

22. A self-synchronous system comprising a transmitter and a receiver, said transmitter and receiver each including a rotor and stator, windings on said rotors and stators for generating a synchronizing torque having a single cycle variation in magnitude throughout 360° of relative displacement between the rotors, additional windings for producing additional torques having odd numbers of cycles of variation throughout said 360° of relative displacement, whereby the synchronizing torques developed in said receiver are relatively high for small angles of displacement between the rotors of the transmitter and receiver, the rotor and stator windings of said transmitter and receiver being respectively connected together, and a source of alternating current connected with the windings of one thereof.

23. A self-synchronous system comprising a transmitter and receiver unit, said transmitter and receiver each including a rotor and stator part, one of said parts of each unit including a winding connected for energization from a voltage source and the other part of each unit including a plurality of groups of windings, the windings of each group of each unit being connected together in the same multicircuit fashion, and those of the respective groups forming a different number of magnetic poles, corresponding windings of said units being respectively connected together.

24. A self-synchronous machine comprising a rotor and a stator and adapted for rotor synchronization with the rotor of a similar machine, means on said rotor and stator for producing a one cycle torque variation for one revolution of said rotor relative to the rotor of the similar machine, and additional means on said rotor and stator for producing additional torque which has a different number of cycles for each revolution of said rotor with reference to the rotor of said similar machine for modifying the said first mentioned torque, whereby the torque at small angles of relative rotor displacement is increased.

25. In a self-synchronous system having a transmitter and receiver, each having a rotor and stator, the stators being electrically connected together, the rotor of the receiver being adapted to synchronize with the rotor of the transmitter, the combination comprising rotating electrical means in said transmitter and receiver for producing a synchronizing torque having a one cycle variation in magnitude for 360 degrees of relative angular displacement of the rotors of the transmitter and receiver, additional electrical means rotatable at the same speed as said rotatable electrical means for producing a supplemental torque adapted to be added to said synchronizing torque and having a different number of cycles for 360 degrees of said relative angular displacement, electrical connections between the said rotating electrical means of said transmitter and receiver, and a source of electrical power for energizing said electrical means, whereby the synchronizing torque developed in said receiver is increased for small angles of displacement between the said electrical means.

26. A self-synchronous system comprising a generator and a receiver, said generator and receiver each comprising a rotor and a stator having windings for generating a synchronizing torque in combination with additional means also causing said rotor to produce a supplemental torque varying more than one cycle in a predetermined displacement of said rotor relative to the rotor of said generator and adapted to be superimposed thereupon, and a source of alternating current for energizing said generator and receiver, whereby the synchronizing torque is increased for small angles of displacement.

27. A self-synchronous system comprising a generator and a receiver, said generator and receiver each comprising a rotor and a stator having means for generating a synchronizing torque, in combination with additional electrical means causing said rotor to produce a supplemental torque varying more than one cycle in a predetermined displacement of said rotor relative to the rotor of said generator, said supplemental torque being adapted to be superimposed on said synchronizing torque, and a source of current for energizing said generator and receiver, whereby the synchronizing torque is increased for small angles of displacement.

28. A self-synchronous machine comprising a rotor and a stator and adapted for rotor synchronization with the rotor of another machine, means on said rotor and said stator for producing a synchronizing torque having a one cycle sinusoidal variation in magnitude for 360 degrees of rotor displacement with reference to the rotor of said other machine, and additional means for producing supplemental torque of an odd number of cycles for 360 degrees of rotor displacement, whereby the synchronizing torque is increased at small angles of rotor displacement.

29. A self-synchronous machine comprising a rotor and stator and adapted for rotor-stator synchronization with the rotor and stator of another machine, means on said rotor and stator for producing a torque which has a single cycle of variation in magnitude throughout 360 degrees of displacement between said rotor and stator with reference to the motor and stator of said other machine, and additional means for producing an additional torque of smaller maximum magnitude than said first-mentioned torque, and having a variation in magnitude of an odd number of cycles throughout said 360 degrees of relative displacement, the variations in said torque being individually of such magnitudes and so correlated as to provide a relatively high synchronizing torque for small angles of relative displacement between said rotors and stators.

30. A machine of the character described, comprising a stator and rotor adapted for rotor synchronization with the rotor of another machine, two-pole windings thereon for developing a torque which has a single cycle of variation in magnitude throughout 360 degrees of relative displacement between said stator and rotor with reference to the rotor of said other machine, and multipole windings for producing an additional torque having a relatively smaller maximum magnitude than said first-mentioned torque and having variations in magnitude of more than one cycle throughout said 360 degrees of displacement, whereby to provide algebraically additive torques.

31. A self-synchronous system comprising a transmitter and a receiver, said transmitter and receiver each including a rotor and stator, means on said rotors and stators for generating a synchronizing torque having a single cycle variation in magnitude throughout 360 degrees of relative displacement between the rotors, additional means for producing additional torques having odd numbers of cycles of variation throughout said 360 degrees of relative displacement, whereby the synchronizing torques developed in said receiver are relatively high for small angles of displacement between the rotors of the transmitter and receiver, the rotors and stators of said transmitter and receiver being respectively connected together, and a source of current connected with one thereof.

32. In combination, a self-synchronous system having a transmitter and a receiver, means interconnecting said transmitter and said receiver for self-synchronous operation, whereby said receiver has an aligning torque that is a circular function of the angular difference between the positions of said transmitter and said receiver, means including at least one other transmitter and receiver adapted to develop a torque integrally related to said first-mentioned torque, and means for combining said torques thereby to provide a resultant torque having increased values at small angular displacements of said transmitter and receiver.

33. In combination, a self-synchronous system having a transmitter and a receiver, means connecting said transmitter and said receiver for self-synchronous operation, whereby said receiver has an aligning torque that is a circular function of the angular difference between the positions of said transmitter and said receiver, and means for adding to said torque another torque that is a circular function of said difference, the last-mentioned function having a period substantially equal to $(1/n)$th the period of the first-mentioned function, where $n$ is an odd integer.

HERMAN H. CURRY.

No references cited.

Certificate of Correction

Patent No. 2,515,496             July 18, 1950

HERMAN H. CURRY

It is hereby certified that error appears in the printed specification of the above numbered patent requiring correction as follows:

Column 4, line 21, for the word "multiple", second occurrence, read *multipole*; column 11, line 10, for "motor" read *rotor*;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*